United States Patent [19]

Wiener

[11] 4,374,513

[45] Feb. 22, 1983

[54] DRESSING APPARATUS FOR CUP-TYPE ABRASIVE WHEELS AS USED FOR GRINDING SPIRAL BEVEL GEARWHEELS

[76] Inventor: Dieter Wiener, Tulpenstr. 9, D-7505 Ettlingen-Bruchhausen, Fed. Rep. of Germany

[21] Appl. No.: 200,001

[22] Filed: Oct. 23, 1980

Related U.S. Application Data

[63] Continuation-in-part of Ser. No. 104,071, Dec. 17, 1979, and a continuation of Ser. No. 904,883, May 11, 1978, abandoned.

[30] Foreign Application Priority Data

Aug. 4, 1978 [DE] Fed. Rep. of Germany ....... 2834149

[51] Int. Cl.³ .............................................. B24B 53/14
[52] U.S. Cl. .................................. 125/11 CD; 51/287
[58] Field of Search ........... 125/11 B, 11 CD, 11 AS; 51/287

[56] References Cited

U.S. PATENT DOCUMENTS

| | | | |
|---|---|---|---|
| 2,038,150 | 4/1936 | Weber | 125/11 CD |
| 2,347,283 | 4/1944 | Ross | 125/11 CD |
| 3,581,730 | 6/1971 | Boyd | 125/11 CD |
| 3,855,992 | 12/1974 | Nordin | 125/11 CD |

FOREIGN PATENT DOCUMENTS

228445 7/1925 United Kingdom ........... 125/11 AS

*Primary Examiner*—Harold D. Whitehead
*Attorney, Agent, or Firm*—Antonelli, Terry & Wands

[57] ABSTRACT

A wheel dressing system is designed for use on a grinding machine for producing spiral bevel gears with a cup-type abrasive wheel having conical faces on or in the edge of its cup. The dressing system makes use of a diamond dressing roller which is moved up in plunge cut motions to the separate flanks or sides of the abrasive wheel. The dresser roller has different cone angles for producing the best fit conditions between them and the grinding flanks of the abrasive wheels to be trued.

14 Claims, 14 Drawing Figures

DRESSING APPARATUS FOR CUP-TYPE ABRASIVE WHEELS AS USED FOR GRINDING SPIRAL BEVEL GEARWHEELS

CROSS-REFERENCE TO RELATED APPLICATIONS

This application is a continuation-in-part of U.S. Pat. Application Ser. No. 104,071, filed Dec. 17, 1979, which, in turn, is a continuation of now abandoned application Ser. No. 904,883, filed May 11, 1978.

BACKGROUND OF THE INVENTION (i) Field to which the invention relates

The present invention is with respect to a dressing apparatus for the cup-type abrasive wheel of a machine for the part-generating or part-form grinding of spiral bevel gearwheels, the abrasive wheel having concave and convex grinding flanks in a groove (or on a ridge), the apparatus having a diamond dressing tool supported on a dressing tool head by way of which it may be rocked and on each motion may be moved in relation to each of the grinding flanks of the abrasive wheel.

(ii) The prior art

Within the framework of the present invention, spiral bevel gearwheels may be taken to be bevel gearwheels with circular pitch curves and other forms of spiral bevel gears. Such bevel gears may undergo grinding in a part-generating process using cut-type abrasive wheels working within the tooth spaces of the bevel gearwheel and acting on two tooth flanks at the same time so that the abrasive wheel will have two straight-flanked conical grinding faces or flanks taking the form of the two sides of an outer cone ring, running out from a plane normal to the axis of turning of the abrasive wheel. Such a grinding process is generally known in the art. In an earlier suggestion (see U.S. application Ser. No. 904,883), the grinding of the two sides or flanks of a given tooth, was to be undertaken using cup-type grinding or abrasive wheels, whose two grinding flanks are turned towards each other, forming between them a cone groove in a plane normal to the axis of grinding. Such a system makes possible the exact grinding not only of a bevel gearwheel, but furthermore the counter-wheel to be used with it, in one and the same working step.

However, in each of these two systems, there is the question of dressing the cup-type abrasive wheel. In an earlier form of apparatus of the sort noted (see U.S. Pat. No. 1,609,947) such dressing is caused by advancing the dressing tool for each grinding flank of the cup-type abrasive wheel. The dressing tool, in the form of a single diamond, is guided along a straight line at the outline of the working flanks of the abrasive wheel using a lead-screw. The change-over or transfer between these two motions is undertaken in such a way that the dressing tool head is rocked through 180° about a rock axis, which is generally parallel to the axis of the abrasive wheel. By having the lead-screw at an angle to the rock axis, it is possible to make certain that the lead-screw is parallel to the generatrix of the working flank of the abrasive wheel in question without any further adjustment being necessary. This is naturally only possible for a given angle included between the work or grinding flanks of the abrasive wheel.

In this prior art apparatus of the sort noted in the first place, it has turned out to be a shortcoming that dressing or truing is a generally slow operation and so high in price. Furthermore, although the dressing tool head is generally simple in design, this is responsible for the shortcoming that no adjustment for use with cup-type abrasive wheels with different included angles between the working flanks is possible. Lastly, it is, generally speaking, not possible with this old system to undertake dressing of abrasive wheels in which the working or grinding flanks are the two sides of a double conical groove. Much the same is furthermore true for a further apparatus on the same lines known in the art, in the case of which a number of single diamonds are moved along the outline or profile of the cup-type abrasive wheel, each on its own diamond support head.

Furthermore, a different design of dressing apparatus has been put forward (see German Auslegeschrift specification No. 2,327,846, which corresponds to U.S. Pat. No. 3,855,992) which is to be used for dressing an abrasive wheel designed, for example, for working the race rings of ball bearings or the like, that is to say workpieces which, generally speaking, have a circular cross-section groove with cylindrical faces to its two sides. This prior art dressing system, which is different from the family of apparatus forming the starting point of the present invention, makes use of a dressing or truing roller which, on dressing, is rocked so as to be at an angle to the axis of turning of the abrasive wheel to be trued and the axis of symmetry of the dressing roller. When the particular part of the tool outline is being dressed, there is point contact between the abrasive wheel and the dressing roller, while in the end positions of the dressing roller there is line contact with the cylindrical parts of the abrasive wheel. So far, this prior art apparatus has not been responsible for any further development of dressing apparatus of the sort noted in the first place. Moreover, the simple use as such of the dressing roller of this known apparatus in the case of the dressing of cup-type abrasive wheels of the sort noted in the first place would not be responsible for the best, high quality work because, in this respect, the different curvature conditions of the grinding flanks to be dressed would not be taken into account.

SHORT OVERVIEW OF THE INVENTION

One object of the present invention is that of designing a dressing apparatus of the sort noted in the first part of this specification, which, on the one hand, makes possible high quality, high speed and low price dressing of the two working flanks of a cup-type abrasive wheel.

An other object of the present invention is that of designing such an apparatus which, while being simple in design, may readily be retooled for different grinding operations and, more specially, may be used for the dressing of cup-type abrasive wheels whose conical flanks or faces are turned towards each other, forming the two sides of a groove within the abrasive wheel body.

For effecting this and other purposes, the dressing tool is a dressing roller, the dressing wheel head is designed for producing a first plunge cut into the desired or preset position of the dressing roller, for rocking the dressing roller about an axis, sloping in relation to the axis of turning of the cup-type abrasive wheel and to the axis of symmetry of the dressing roller, and for producing a second plunge cut into a desired position of the dressing roller, the dressing roller being a diamond grit abrasive dressing roller and having two conical faces with different cone angles.

It will be seen from this that the profile or outline of the cup-type abrasive wheel is not produced by a traversing motion of single diamonds but by line-contact with the driving roller, which, on each of its plunging cutting motions is run into a preset or desired position. The dressing roller has two conical faces, of which each is separately used for grinding or truing a different one of the two grinding (or, in the present case, work) flanks of the cup-type abrasive wheel, the two said conical faces of the dresser being unsymmetrical, that is to say they have different cone angles. This part of the invention is because of the fact that, on the one hand, in the case of cup-type abrasive wheels of the design noted in the present case, the grinding flanks have different curvatures and, on the other hand, for the dressing effect produced, the "snugness" of fit between the grinding or working flank and the conical part of the dressing roller answering to it is controlling. This "snugness of fit" is dependent, on the one hand, on the curvature of the grinding flank in question and, on the other hand, on the curvature and, for this reason, of the cone angle of the conical part, dressing the abrasive wheel, of the conical dressing roller. Because in the present invention the dressing roller is not symmetrical, it is possible to make certain of the best possible degree of harmony between the dressing roller and the grinding flanks so as to get the snuggest fit.

On dressing, the dressing roller, put in the desired position of angle by adjustment, is moved plungingly up to and against the first grinding or work flank. When this flank has been dressed or trued, the dressing roller is moved back and rocked into the angle position answering to the second working flank of the cup-type abrasive wheel so that the second plunging cut may be taken, in which the second working flank is trued, whereupon the dressing roller is moved back again. For reasons of geometry, the axis of rocking, about which the dressing roller is turned or rocked, is generally unimportant, under the condition, however, that it is at an angle to the axes of the cup-type abrasive wheel and the dressing roller. More specially, the axis of rock will, however, be normal (or orthogonal) to the axis of turning of the cup-type abrasive wheel and it is best for it to be normal to the axis of symmetry of the dressing roller (which naturally is rotationally symmetrical). Whatever the design used, it will be possible to make certain that the dressing motions of the dressing roller are produced in a simple way and for retooling it will only be necessary for stops to undergo adjustment, which are used for limiting the plunging and rocking motions. Furthermore, because of the line contact between the cup-type abrasive wheel and the dressing roller, dressing will take place at a much higher rate than using a single diamond.

Because material is run off from the abrasive wheel on dressing, feed between the abrasive wheel and the dressing roller is necessary, it best being undertaken by the abrasive wheel (possibly together with its arbor and the grinding wheel motor) being fed axially, while the dressing roller is, in all cases, moved or plunged into its unchanged, fixed dressing positions.

With these measures of the invention as such, it is generally possible for cup-type abrasive wheels to be dressed or trued which have conical faces turned away from each other (on the sides of a ring) or turned towards each other (on the sides of a groove). From the point of view of motion of the system (or cinematic point of view) a design is best in the case of which, between a first and second plunge cut, and more specifically generally at the same time with the plunge cut, a changeover motion is undertaken in a direction, which is normal to the axis of turning of the cup-type abrasive wheel and to the axis of rocking so that, having a fixed distance between the dressing roller and the axis of rocking, all necessary adjustments may be produced. Furthermore, the position of the rock axis may be generally selected quite freely, although specially straightforward conditions of operation with short distances moved will be produced if the rock axis is generally within the plane of the dressing roller and, more specially, outside its axis.

For adjustably limiting the plunge-cutting, changeover and rocking motions, it is best to make use of stops with micrometerscrews, it naturally being possible for the stops or for the micrometerscrews to be fixed to the machine.

In an earlier suggestion (see U.S. application Ser. No. 904,883) on grinding the axis of turning of the cup-abrasive wheel was to be moved eccentrically in a cycle for producing the useful effect of crowning or barreling and, at the same time decreasing danger of burns caused by grinding. On this further motion, the grinding axis is generally moved so as to keep parallel to itself, for example by way of an eccentric bearing sleeve on the grinding arbor bearing. In the case of one working example of the invention with such further or additional motion, the motion may be locked in a given stage thereof, for example by a positive locking system, in relation to the machine frame, as for example by way of a key pin or by way of a pressure piece acted upon springingly or hydraulically so as to be forced into the key-way on the guide part of the grinding arbor.

It is best for a dressing motor to be used for conventionally driving the dressing roller. It is a known fact that the dressing operation, more specially with respect to the dressing rate or effect and the effective depth of roughness or opening, is greatly dependent on the relation between the speeds of the grinding wheel and the dressing roller and on if the two parts are turned in the same or opposite directions. For this reason, a useful effect is produced if the dressing motor is a variable speed, reversible motor, it being more specially useful if, at the time of the first or second feed motion, the dressing motor is automatically changed over between two speeds. This takes care, in a specially simple way, of the fact that, on dressing, the degree of "snugness" between the dressing roller and the cup-type abrasive wheel at the work flanks being dressed is not the same. As outlined earlier, the work flanks of cup-type abrasive wheels of the design noted have different curvatures and it will, more specially, be clear to the reader that, in the case of cup-type abrasive wheels of the design noted in the first place, there is, in every case, a convex and a concave grinding or working flank, the convex flank resting much less snugly against the dressing roller than is the case with the concave work flank. For this reason, the best conditions of dressing at the work flanks are produced with different speeds. Furthermore a specially useful effect is produced if the dressing roller is so designed that its conical face used for truing the convex work flank of the cup-type abrasive wheel has a greater cone angle, for this reason, is blunter and has lesser curvature than the conical face (of the dressing roller) working the concave work flank. On development of this design, it is even possible to go so far that the blunter conical face takes the form of a plane or a cone let in to the dresser roller. However, throughout, it is to be taken into account that the dresser roller will, as a general rule, have a smaller diameter than the work or grinding flank.

Different possible motions of the dressing roller come into question. In fact, the dressing roller head may take the form of a compound (slide) table at the same time, the plunge cut motion taking place in a directin parallel to the axis of turning of the cup-type abrasive wheel while the changeover motion is normal thereto. The rocking motion of the dressing roller will take place in the common plane of the two plunge cut motions. The motions of the dressing roller do not have to necessarily take place along a straight line. However, a further useful development of the invention is characterized in that the plunge cuts are rocking motions about a plunge cut axis, which is to the side of the cup-type abrasive wheel (and so not cutting its axis of turning), the plunge cut axis being normal or orthogonal to the axis of turning of the cup-type abrasive wheel, this offering a specially simple way of stopping any smash-up or collision between the dressing system and a conical (metal) wheel undergoing grinding. The changeover motion may, in this respect, take place as a rocking motion as well, although, in this respect, as a specially simple form of the invention, the dressing roller may be positioned on a rocker arm, which may be rocked about a shaft parallel to the plunge axis and able to be shifted axially in relation to this shaft. Plunge cut motion may then take place as a rocking motion about the shaft while the changeover motion will be an axial shift. If, for reasons of geometry, a circular plunge cut motion is undesired as the dressing roller comes up against the abrasive wheel, the plunging motion may furthermore be undertaken by axial motion of the abrasive wheel. More specially, if plunge cut motions are to be undertaken at two speeds (as will be made clear later) a useful effect will be produced if the dressing roller is rocked into the dressing position at the feed speed and then the plunge cut motion itself is undertaken at the working speed by axial feed of the abrasive wheel. All such motions and different ways of causing feed noted may readily be produced with hydraulic servo and control systems as known in the art.

For producing a simple and straightforward geometry of the system, it is best, in every case, for the plunge cut, rocking and changeover motions to take place in planes which are parallel to a plane as fixed by the axes of the abrasive wheel and the dressing roller. For decreasing the force at the edge of the dressing roller, furthermore, the plunging motion may be undertaken radially and normal to the work (or grinding) flank in question.

In the interests of increasing the speed of operation, it is furthermore best for the plunge cut motions to be undertaken, in each case, in two stages, that is to say firstly with a higher feed speed and then—after running up to a position near the work flank—at a lower speed of plunge-cut. Backward (or retraction) motion may naturally take place, in the opposite direction, at the feed speed. Furthermore, a useful effect is produced if, at the end of the plunge cut motion, the dressing roller is kept for an adjustable time in its end position and before being moved back (rolling out) is undertaken (which is generally the same as sparking out on grinding metal).

SHORT DESCRIPTION OF DRAWINGS

An account will now be given of some working examples of the invention to be seen in the figures.

DETAILED ACCOUNT OF WORKING EXAMPLES OF THE INVENTION

On grinding bevel gearwheels with circular pitch curves by part-generating grinding, cup-type abrasive wheels 1 are used, which have conical grinding flanks 2 and 3. In the working example of FIG. 1, the grinding flanks 2 and 3 are turned towards each other, forming a groove with conical inner faces (turned towards each other) let into a plane normal to the axis 4 of grinding. In the working example of FIG. 2, the grinding flanks 2 and 3 are turned facing away from each other so as to take the form of an outwardly running ring, with conical faces, sticking out from a plane normal to the axis 4 of grinding. As will readily be seen, whatever the system, there will be a convex grinding flank 2 and a concave grinding flank 3. For dressing a cup-type abrasive wheel, turning about the grinding axis 4, a dressing roller 5 is used, which is drivingly turned about axis 6 and pressed firstly against one and then against the other work flank 2 and 3, the two positions being seen in FIG. 1. Dressing roller 5 is compounded using diamond grit and has the form of a double cone. In the working examples of FIG. 1, dressing roller 5 is symmetrical, so that it is different to the design of the invention noted earlier, yet also differs from the prior art in that surface contact (as opposed to point contact) is made between the dressing roller and grinding flank. The dressing roller to be seen in working example 2 is, on the other hand, unsymmetrical in structure and has a more acute conical face 7 for acting on the concave work flank 4, and furthermore conical face 8 for grinding the convex work flank 2, this conical face 8 being somewhat let in and so having a negative cone angle (i.e., as seen in FIG. 2, both face 7 and face 8 slope toward the same axial side of roller 5). Putting it differently, conical face 8 is itself somewhat concave. Because of this unsymmetrical structure, the two work (or grinding) flanks 2 and 3 undergo grinding with generally equal conditions of snugness or fit, that is to say the differences in radius between the work and dressing faces in the two cases are much the same. In the working example to be seen, dressing roller 5 is a single-piece structure, although it would be possible for the dressing roller to be made up of two parts with conical faces, something more specially coming into question on dressing cup-type abrasive wheels with grinding flanks (see FIG. 2) turned away from each other, because, for this reason, the motion of the dressing roller on changing over from one work flank to the other would be less great. The work flanks then being between the said two parts of the roller.

Figure 1:
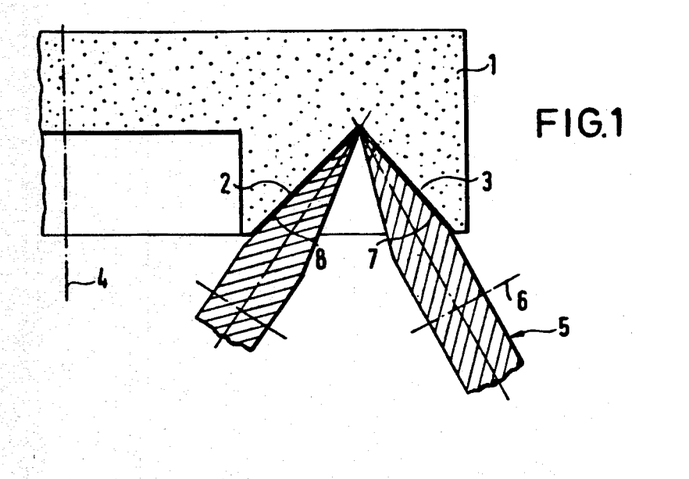
FIG. 1 is a diagrammatic view of a cup-type abrasive wheel on being dressed with a dressing roller.
Figure 2:
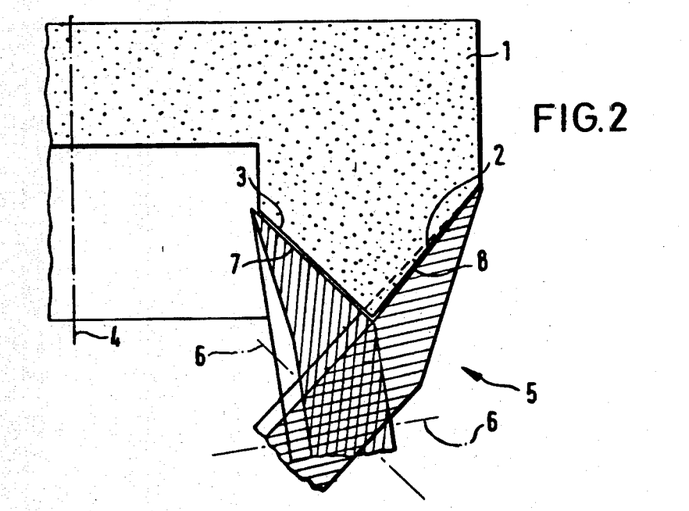
FIG. 2 is a view of an other form of the invention of FIG. 1.
Figure 3A:
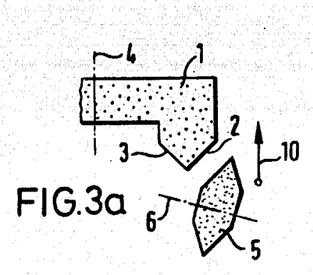
FIGS. 3a to 3i are views of different stages of motion of the dressing wheel.
Figure 3B:
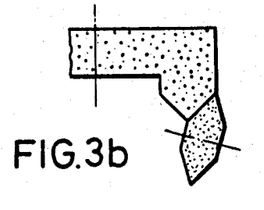
Figure 3C:
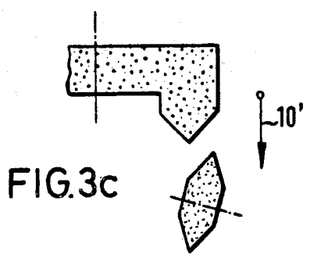
Figure 3D:
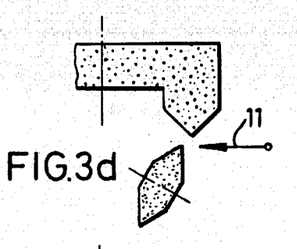
Figure 3E:
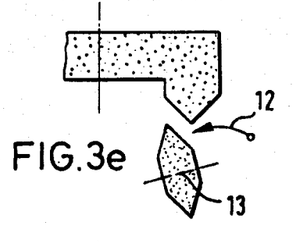
Figure 3F:
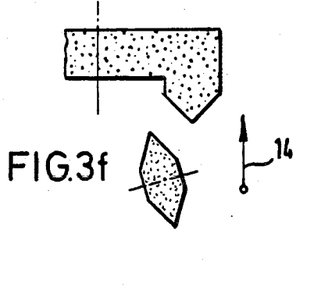
Figure 3G:
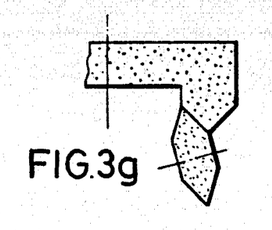
Figure 3H:
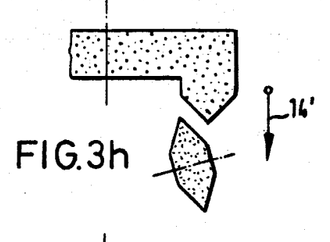
Figure 3I:
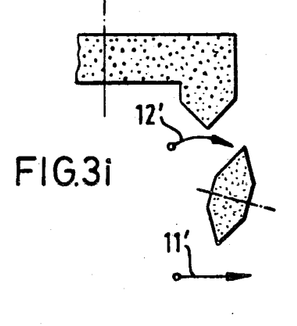

The stages of motion in the dressing operation will now be made clear using FIG. 3, which is not fully in line with the invention's teaching in that the dressing roller is a symmetrical structure, such as shown in FIG. 1. Dressing roller 5 is firstly moved plunge cuttingly out of the position of FIG. 3a in the direction of arrow 10 into the preset or desired position of FIG. 3b, in which work flank 2 of cup-type abrasive wheel 1 is dressed or trued. Nextly, dressing roller 5 is moved back as arrowed 10' and it is then moved in a changeover step, generally normal to the direction of the plunge cut, see arrow 11, so as to be opposite to the other work flank 3 (FIG. 3b) and then, by a rocking motion as arrowed 12 (about rock axis 13) goes into the starting position for dressing the other work flank 3 (see FIG. 3e). As the reader will now see from FIG. 3f, a second plunge cut motion is taken (arrowed 14) and in the position of dressing roller 5 of FIG. 3g, the concave work flank 3 is trued. When this has been done, dressing roller 5 is moved back as arrowed 14' (see FIG. 3h), and by undertaking the rocking and changeover motion in the opposite direction (see FIG. 3i, arrows 11', 12') goes back into the starting position of FIG. 3a.

It will be clear from FIG. 3 that the rock axis 13 of dressing roller 5 is generally normal not only to grinding axis 4, but furthermore to the axis of dressing roller 5 which is cut by it. The motions noted 10, 11, 12 and 14 and the opposite motions answering to them 10', 11', 12' and 14' all take place in a plane parallel to a plane having within it the grinding axis 4 and the axis 6 of dressing roller 5. In the present working example, plunge cut motions 10, 14 are, in this respect, generally parallel to grinding axis 4, although it would be possible, as a further development of the invention, for the plunge cuts to be so taken that they are generally normal to the work flank to be dressed in each case.

Figure 4:
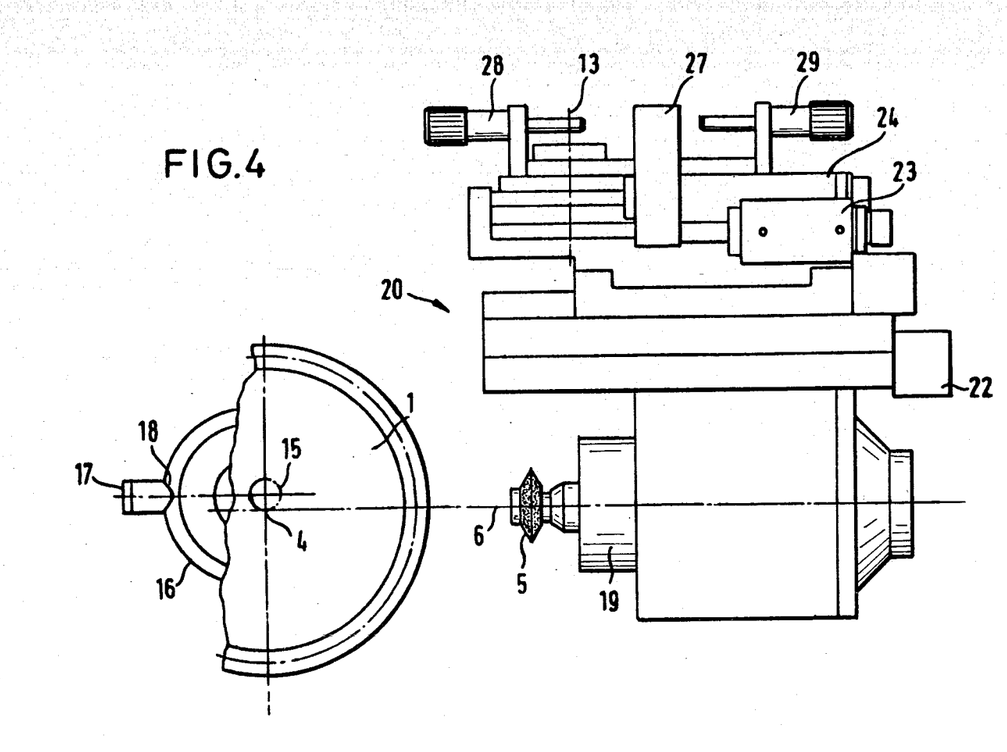
FIG. 4 is an end-on view of an apparatus for dressing a cup-type abrasive wheel.
Figure 4A:
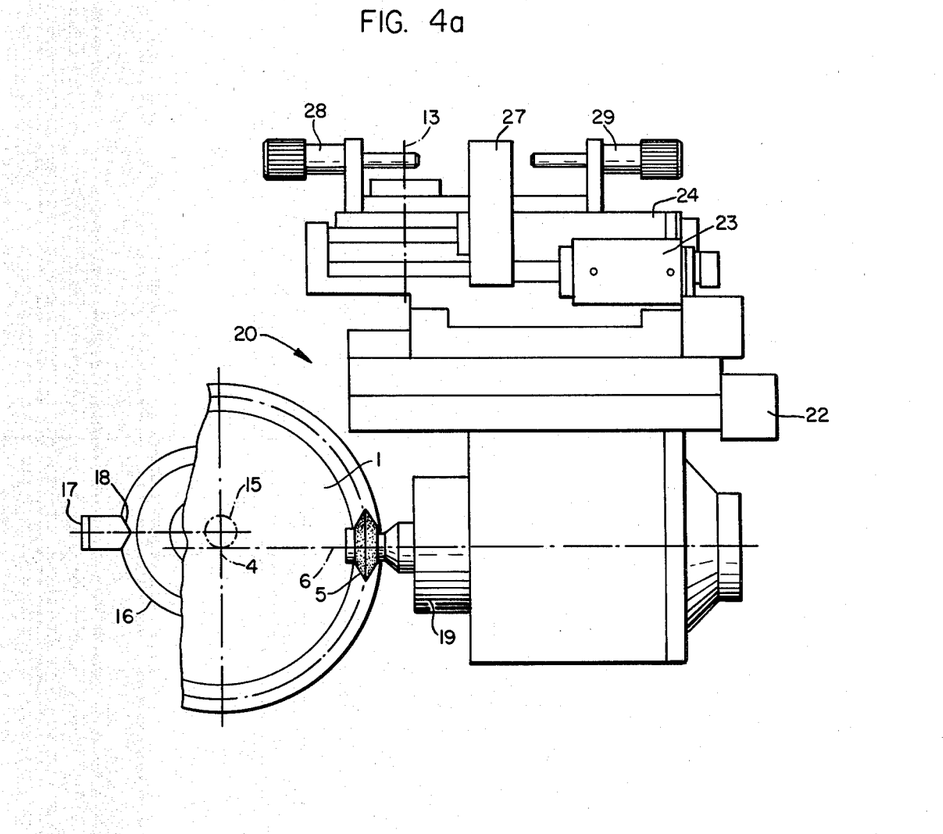
Figure 5:
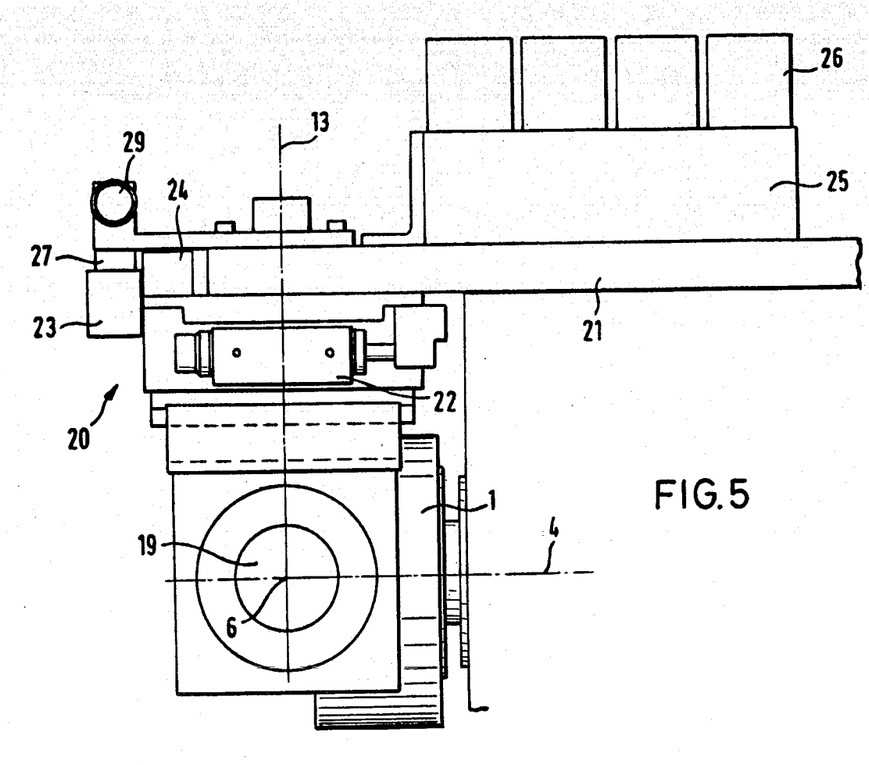
FIG. 5 is a side-view of the structure of FIG. 4.

FIGS. 4 and 5 give details of a dressing apparatus for a grinder using a cup-type abrasive wheel 1 for processing bevel wheels with circular pitch curves. The cup-type abrasive wheel 1 has two grinding flanks 2 and 3, turned towards each other, forming a ring groove with conical faces let into the abrasive wheel. The wheel is so bearinged that the axis 4 of grinding may be cyclically moved with a small degree of eccentricity, that is to say along circle 15 as will be seen in the figure. For this purpose, the grinding arbor bearing itself is eccentrically placed in a bearing sleeve 16 which, for its part, is turningly bearinged in the machine frame, of which no details are given here. For dressing cup-type abrasive wheel 1, the further motion 15 may be locked in a given position by a hydraulically moved pressure dog 17 being forced into a key-way 18 in the outer face of bearing sleeve 16.

The diamond dressing roller is powered by a dressing motor 19 which is in the form of a variable speed, reversible DC motor. The system is so designed that on changing over between a first and a second plunge cut motion, the speed of dressing motor 19 is changed over to a value, which makes certain of the best dressing rate and quality taking into account the different degrees of fit or "snugness" of the work and dressing faces, that is to say difference in their radiusses.

For causing the motions of the dressing roller 5, which have been noted, dressing motor 19 is supported in a dressing head 20, taking the form of a compound table and which may be rocked about rock axis 13, it being fixed to a base-plate 21. The change in position with the different degrees of freedom as possible with this design, is undertaken using hydraulic cylinder piston units 22, 23, 24, controlled by way of control panel 25 and separate valves 26. The slides of compound table 20 make possible plunge cut motions 10, 14 under the power of the cylinder piston unit 22 while the changeover motion 11, normal to this motion, is caused by cylinder piston unit 23. Rocking of the compound table 20 generally and, for this reason, of the dressing roller 5 about rock axis 13 is produced by cylinder piston unit 24.

All such motions are limited in their amount adjustably by stops and micrometerscrews used with them, as will be seen for example for the changeover motion in FIGS. 4 and 5. On the right slide of compound table 20, a stop 27 is placed, on which, at the same time, the two micrometerscrews (fixed to the machine) 28, 29 are placed, with which the amount of motion of stop 27 and, for this reason, the changeover motion, may be adjusted.

Figure 6:
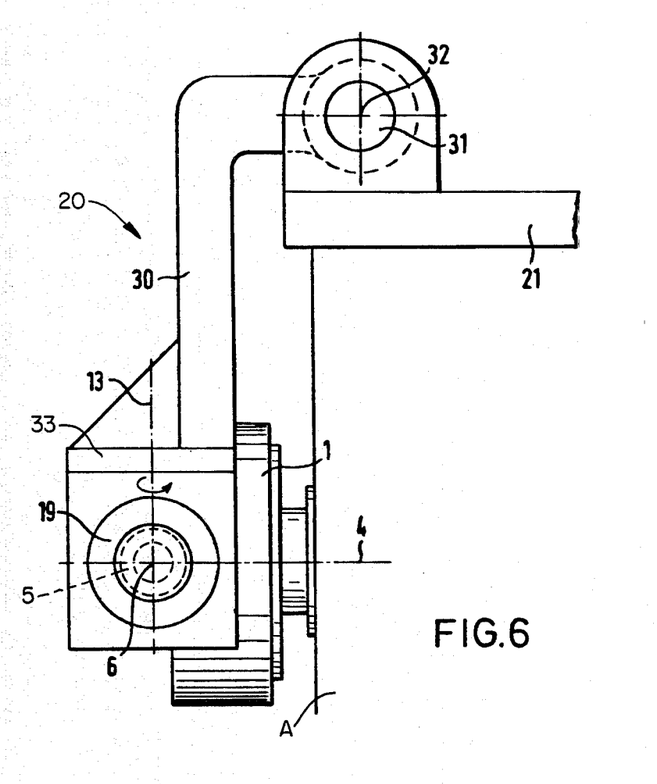
FIG. 6 is a view, on the same lines as in FIG. 5, of a further working example of a dressing apparatus.

FIG. 6 is a side-view of a further working example of a dressing system in which there is, generally speaking, no chance of any smash-up with the bevel wheel undergoing grinding. The dressing head 20 is, in this case, generally in the form of a rocker arm 30, rockingly supported on shaft 31 on baseplate 21. The plunge cut axis 32 is in this case the same as the axis of shaft 31, axis 32 being to the side and at a higher level than the cup-type abrasive wheel 1 to be dressed and at a right angle to grinding axis 4. Because of this, the plunge cut motions 10 and 14 are not in the form of straight line motions as in the working example noted beforehand, but are in fact in the form of parts of circles about plunge cut axis 32. For the changeover or transfer motion, the rocker arm 30 may be shifted in relation to shaft 31, that is to say in a direction normal to the plane of the figure. The rocking motion (not to be seen in FIG. 6) of the dresser roller is made possible because the dressing motor is bearinged on a wing 33, present at the free end of rocker arm 30, for turning or rocking motion about the rock axis 13 normal to the plunge cut axis 32. Hydraulic cylinder piston units, with which, once again, motion and shifting in the system is caused, and stops with separate micrometerscrews for limiting the distance moved, have not been detailed in FIG. 6 in order to make it simpler and less crowded.

In the working examples noted so far, control of the plunge cut motions 10 and 14 is so undertaken that, in the interests of high-speed operation, the dressing roller is firstly moved at a high feed rate to a position near the cup-type abrasive wheel and is then moved into the dressing position at a lower working speed. The control system is furthermore so designed that at the end of plunge cuts, the dressing roller is kept in its end position for an adjustable time so that the work is turned for a given number of times for rolling off, this being a process like sparking off on grinding metals.

The figures do not make it clear that the abrasive wheel, together with the grinding arbor and grinding motor may undergo feed in an axial direction. Such motion firstly takes into account the grinding away of stock from the work in the dressing operation. Moreover, it is possible (this being specially useful in the case of the system of FIG. 6) for the dressing roller to be run up at a generally high feed speed, without touching the abrasive wheel, into the dressing position while the plunge cut itself, in which the dressing roller comes up against the abrasive wheel, takes place at the working speed.

I claim:

1. A dressing apparatus for dressing of a cup-type, abrasive, spiral bevel gear-grinding wheel having a concave conical grinding flank, a convex conical grinding flank and an axis of turning, comprising:
   (A) means for holding said cup-type grinding wheel parallel to its axis of turning;
   (B) a diamond abrasive dressing roller having an axis of symmetry and two conical dressing surfaces, one of which has a larger cone angle than the other;
   (C) a dressing tool head for supporting said dressing roller arrangement;
   (D) means for producing a first plunge cutting motion of said tool head, from a first position thereof, toward a said cup-type grinding wheel held by said means for holding, in a manner causing the conical dressing surface of said dressing roller having the larger cone angle to dress said convex conical grinding flank of the grinding wheel and for producing a second plunge cutting motion of said tool head, from a second position thereof, toward said cup-type grinding wheel, in a manner causing the conical dressing surface of the dressing roller having the lesser cone angle to dress said concave conical grinding flank of the grinding wheel; and
   (E) means for shifting said dressing tool head from said first position thereof to said second position thereof in a manner rocking said dressing roller about an axis at an angle relative to the axis of turning of said grinding wheel and the axis of symmetry of the dressing roller.

2. A dressing apparatus as claimed in claim 1, wherein the conical flanks of said cup-type abrasive wheel are turned towards each other, forming two sides of a groove let in to said abrasive wheel.

3. A dressing apparatus as claimed in claim 1, wherein the said conical flanks of said cup-type abrasive wheel are turned facing away from each other, forming the two sides of a ridge running out from said abrasive wheel.

4. A dressing apparatus as claimed in claim 1, wherein the said rock axis is normal to at least one of the said axis of turning of said cup-type abrasive wheel and the axis of symmetry of the said dressing roller.

5. A dressing apparatus as claimed in claim 1, wherein for shifting said dressing tool head between the first and the second plunge cut motion positions, said means for shifting produces a motion in a direction generally normal to the turning axis of of the said cup-type abrasive wheel and the rock axis.

6. A dressing apparatus as claimed in claims 1 or 2 or 3 or 4 or 5, further having micrometerscrews and stops for limiting the plunge cutting motion, the changeover motion and the rock motion.

7. A dressing apparatus as claimed in claims 1 or 2 or 3 or 4 or 5, further having a driving motor for driving said dressing roller.

8. A dressing apparatus as claimed in claim 7, comprising a system for producing at least one of an adjustment of said motor's speed and a changeover in its direction of turning for automatically changing over between two given speeds of turning between the first and the second plunge cutting motions.

9. A dressing apparatus as claimed in claims 1 or 2 or 3 or 4 or 5, wherein the means for producing the plunge cutting motion is operable to displace the dressing roller in a direction generally parallel to the abrasive wheel's axis of turning, while the shifting motion is generally normal thereto.

10. A dressing apparatus as claimed in claims 1 or 2 or 3 or 4 or 5, wherein the means for producing the plunge cutting motions is operable for producing rocking motions of the dressing roller about a plunge cut axis spaced from the cup-type abrasive wheel and normal to its axis of turning.

11. A dressing apparatus as claimed in claims 1 or 2 or 3 or 4 or 5, wherein the means for producing the plunge cutting motions is operable for displacing the dressing roller radially and normally to the grinding flank to be worked in a respective one of the two plunge cutting motions.

12. A dressing apparatus as claimed in claims 1 or 2 or 3 or 4 or 5, wherein the means for producing is operable for causing the plunge cutting motions to take place at a high feed speed during a first portion thereof and then at a lower working speed during a second portion thereof.

13. A dressing apparatus according to claim 1, wherein the conical dressing surface of the dressing roller having the larger cone angle for dressing the convex conical flank of the grinding wheel is concave, and the conical dressing surface having the lesser cone angle for dressing the concave conical flank of the grinding wheel is convex.

14. A dressing apparatus according to claim 13, wherein both of said conical dressing surfaces slope toward the same axial side of the dressing roller.

* * * * *